UNITED STATES PATENT OFFICE.

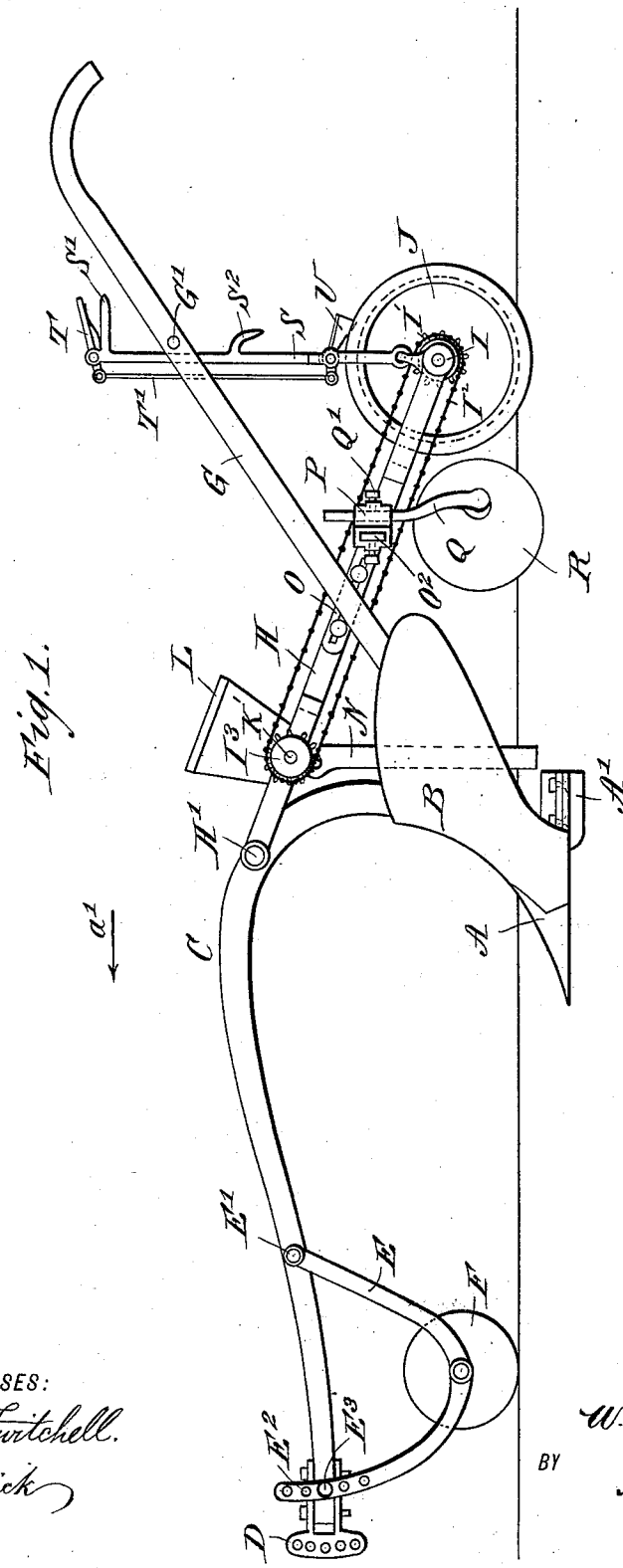

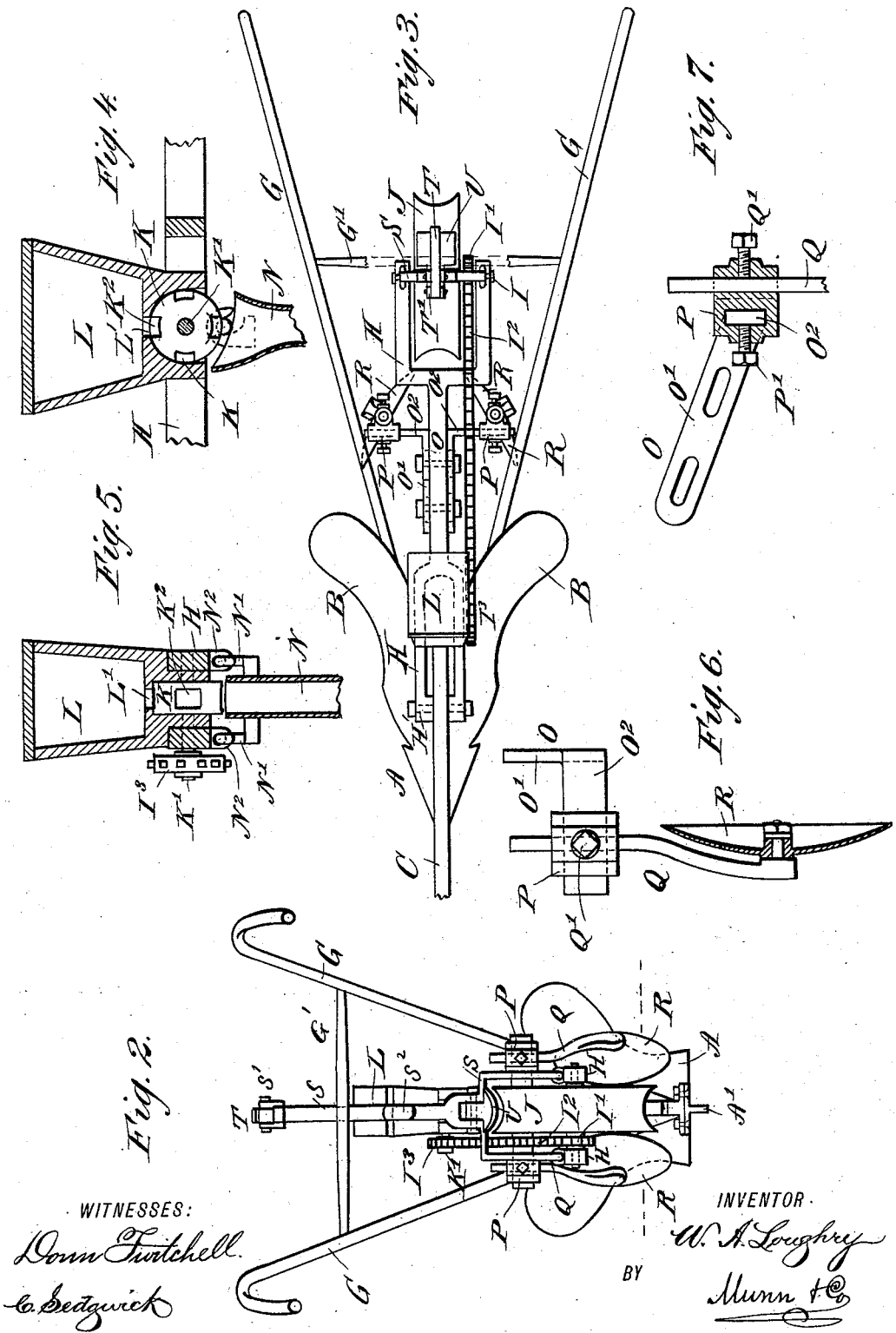

WILLIAM A. LOUGHRY, OF ODESSA, NEBRASKA.

COMBINED LISTER AND DRILL.

SPECIFICATION forming part of Letters Patent No. 422,603, dated March 4, 1890.

Application filed April 2, 1889. Serial No. 305,726. (No model.)

*To all whom it may concern:*

Be it known that I, WILLIAM A. LOUGHRY, of Odessa, in the county of Buffalo and State of Nebraska, have invented a new and Improved Combined Lister and Drill, of which the following is a full, clear, and exact description.

The invention relates to combined listers and drills such as shown and described in the application for Letters Patent filed by me September 5, 1888, Serial No. 284,647.

The object of the invention is to provide certain new and useful improvements in a combined lister and drill, whereby any desired amount of soil can be turned onto the seed in the center of the trench formed by the plow.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is an end elevation of the same. Fig. 3 is a plan view of the same with parts broken out. Fig. 4 is an enlarged sectional side elevation of the seed-box. Fig. 5 is a transverse section of the same. Fig. 6 is an enlarged transverse section of a disk and its support, and Fig. 7 is an enlarged sectional side elevation of the disk-holder.

The combined lister and drill is provided with a plow A, on which are secured the mold-boards B, and to the latter and the plow A is fastened the plow-beam C, extending to the front and carrying at the outer end the usual clevis D, carrying the whiffletree to which the horses are attached. On the plow C is pivoted at E' the curved bar E, carrying at its lowest point a wheel F, traveling on the ground in front of the plow A, and serving to regulate the depth of the trench formed by the plow. The front end of the bar E is provided with a number of apertures $E^2$, through one of which passes a pin $E^3$, also passing through a corresponding aperture in the front end of the plow-beam C. When the pin $E^3$ is removed, the bar E can be raised or lowered to any desired height, so as to adjust the wheel F. The pin $E^3$ is then inserted through the corresponding aperture $E^2$ registering with the aperture in the beam.

Near the rear end of the beam C is pivoted, at H', a frame H, extending rearward and carrying at its rear end a shaft I, on which is secured a grooved wheel J, held in line with the plow A. On the shaft I is also secured a sprocket-wheel I', over which passes a sprocket-chain $I^2$, also passing over a sprocket-wheel $I^3$, secured on a shaft K', mounted to turn in suitable bearings in the upper end of the frame H, which at this point carries the seed-box L. (See Figs. 4 and 5.) On the shaft K' is secured the seed-dropping wheel K, provided with recesses $K^2$ in its periphery, said recesses being adapted to register with an aperture L', formed in the bottom of the seed-box L.

The seed-dropping wheel K is mounted to turn in a suitable recess in the bottom of the seed-box L, and is adapted to discharge into the spout N, extending downward between the mold-boards B to discharge into the center of the trench formed by the plow A. The latter may be provided at its rear end with a small ridger or subsoiler A', extending below the plow, so as to form a small furrow, into which the seed is dropped from the spout N. The latter is provided at its upper end with hooks N', hooking into apertured lugs $N^2$, secured to the frame H.

On the pivoted frame H, between the grooved wheel J and the seed-box L, are secured on each side angle-irons O, each of which has its part O' provided with slots, through which pass bolts securing the angle-irons to the frame H. The slots in the parts O' permit of a longitudinal adjustment of the angle-irons. The other arm $O^2$ of each angle-iron extends at right angles to the frame H, and on it is mounted to slide a holder P, in which screws the set-screw P' for securing the holder at any desired point on the arm $O^2$. A vertical slot is formed in the holder P, and through it passes a rod Q, adapted to be turned in the said holder and raised or lowered to any desired height and then fastened in place by a set-screw Q', screwing in the holder P. (See Fig. 7.)

On the lower end of each rod Q is mounted to turn loosely a concaved disk R, held in front of the grooved wheel J, as is plainly shown in Fig. 1. The two concave disks R are set at an angle to each other, the apex being toward the rear, so that the soil turned up by the plow A is thrown by the said disks onto the seed dropped in the rear of the plow A through the spout N from the seed-box L. As the rod Q is vertically adjustable and can be turned in the holder P, any desired position may be given to the said concave disks R. The grooved wheel J, following directly behind the disks R, serves to tamp and give an oval form to the ridge in the bottom of the trench formed by the disks R.

The rear end of the frame H is pivotally connected with the upwardly-extending rod S, which extends between the plow-handles G, secured in the usual manner to the moldboards B. On the upper end of the rod S is formed a handle S', by which the operator can conveniently raise or lower said rod S, thereby causing an upward or downward swinging motion of the frame H and a lifting of the grooved wheel J and the disks R whenever desired. On the rod S is secured a hook $S^2$, adapted to be thrown over a transverse rod G', secured to the handles G. When the operator lifts the rod S upward, as before described, he can hook the hook $S^2$ over the rod G', so as to hold the wheel J and the disks R in an elevated position.

Next to the fixed handle S' is pivoted a spring-lever T, pivotally connected by the link T' with a scraper U, fulcrumed on the rod S and resting in the periphery of the wheel J, so as to scrape off any dirt gathering on the periphery of the said grooved wheel J.

The operation is as follows: When the improvement is drawn forward in the direction of the arrow $a'$, the plow A, with the small plow A', forms a trench into which the seed is discharged from the seed-box L. The seed-dropping wheel K in the said seed-box is operated from the wheel J, so that seed is regularly dropped at suitable intervals. The disks R, following directly behind the plow A, form a ridge over the seed in the trench. The grooved wheel J in the rear of the disks R tamps the ridge and gives it an oval form, so that the seed planted in the trench will readily germinate in the dry season, and at the same time prevents an early germination of the weed-seeds. The form of the ridge in the bottom of the trench also allows an earlier cultivation of the corn, &c., by the use of the harrow or cultivator than can be obtained by other forms of listers and drills now in use. It will further be seen that the soil thrown over by the plow buries the surface between the trenches without any break or thin spot to allow the early germination of weed-seeds.

Having thus fully described my invention, I claim as new and desire to secure by Letters Patent—

1. A drill attachment for plows, comprising a frame adapted to be pivoted to a plow-beam, a grooved wheel mounted in the rear end of the frame, a hopper on the upper end of the frame, a seed-dropping wheel journaled in the frame below the hopper, a seed-spout below the wheel, angle-bars adjustably secured to the frame, concave disks adjustably secured to the bars, a bar pivoted to the rear of the frame and adapted to engage the round of the plow-handles, and means for operating the seed-dropping wheel from the grooved wheel, substantially as herein shown and described.

2. A drill attachment for plows, consisting of the frame H, the grooved wheel J, journaled in the lower end of the frame and provided with the sprocket-wheel I' on the end of its shaft, the dropping-wheel K, journaled in the upper end of the frame and provided with the sprocket-wheel $I^3$ on the end of its shaft, the chain $I^2$, passing over the said sprocket-wheels, the hopper L above the dropping-wheel, the spout N below the said dropping-wheel, the slotted angle-irons O, adjustably secured to the opposite sides of the frame, the holders P, adjustably secured to the angle-irons, the standards Q, adjustably secured in the holders, and the disks mounted on the lower ends of the standards, substantially as herein shown and described.

WILLIAM A. LOUGHRY.

Witnesses:
E. A. CUTTING,
W. H. HOLDEN.